United States Patent
Hillesund et al.

(10) Patent No.: US 8,553,490 B2
(45) Date of Patent: Oct. 8, 2013

(54) ARRAY GROUPING OF SEISMIC SENSORS IN A MARINE STREAMER FOR OPTIMUM NOISE ATTENUATION

(75) Inventors: Øyvind Hillesund, Houston, TX (US); Hocine Tabti, Oesteraas (NO)

(73) Assignee: PGS Geophysical AS, Oslo (NO)

( * ) Notice: Subject to any disclaimer, the term of this patent is extended or adjusted under 35 U.S.C. 154(b) by 801 days.

(21) Appl. No.: 11/983,571

(22) Filed: Nov. 9, 2007

(65) Prior Publication Data
US 2009/0122641 A1  May 14, 2009

(51) Int. Cl.
*G01V 1/38* (2006.01)
*G01V 1/20* (2006.01)

(52) U.S. Cl.
CPC . *G01V 1/38* (2013.01); *G01V 1/201* (2013.01)
USPC .......................................................... 367/20

(58) Field of Classification Search
USPC ............................... 367/15, 20–24
See application file for complete search history.

(56) References Cited

U.S. PATENT DOCUMENTS

| | | | |
|---|---|---|---|
| 4,319,347 A | 3/1982 | Savit | |
| 4,388,711 A | 6/1983 | Fay | |
| 4,486,865 A | 12/1984 | Ruehle | |
| 4,538,251 A * | 8/1985 | Steetle | 367/154 |
| 4,744,064 A * | 5/1988 | Hughes | 367/22 |
| 4,935,903 A | 6/1990 | Sanders et al. | |
| 4,979,150 A * | 12/1990 | Barr | 367/24 |
| 5,430,689 A * | 7/1995 | Rigsby et al. | 367/15 |
| 5,621,700 A | 4/1997 | Moldoveanu | |
| 6,684,160 B1 | 1/2004 | Ozbek et al. | |
| 7,239,577 B2 | 7/2007 | Tenghamn et al. | |
| 2005/0195686 A1 | 9/2005 | Vaage et al. | |
| 2006/0239117 A1 | 10/2006 | Singh et al. | |

FOREIGN PATENT DOCUMENTS

| | | |
|---|---|---|
| GB | 2 180 341 | 3/1987 |
| GB | 2180341 A * | 3/1987 |

OTHER PUBLICATIONS

M. Schoenberg, J.F. Mifsud, (1974), "Hydrophone Streamer Noise XP-002115038", Geophysics, vol. 39, No. 6, pp. 781-793.

* cited by examiner

*Primary Examiner* — Krystine Breier

(57) ABSTRACT

A marine seismic streamer includes at least one particle motion sensor array. The array includes a plurality of particle motion sensors disposed at spaced apart locations along the streamer. Outputs of the particle motion sensors are functionally coupled to form an array. A number of the particle motion sensors and a spacing between adjacent particle motion sensors are selected to attenuate noise in a selected mode of propagation and within a selected wavenumber range. The streamer includes means for weighting a signal output of each particle motion sensor in the at least one array. A signal weight applied to each sensor by the means for weighting is selected to optimize attenuation of the noise.

8 Claims, 4 Drawing Sheets

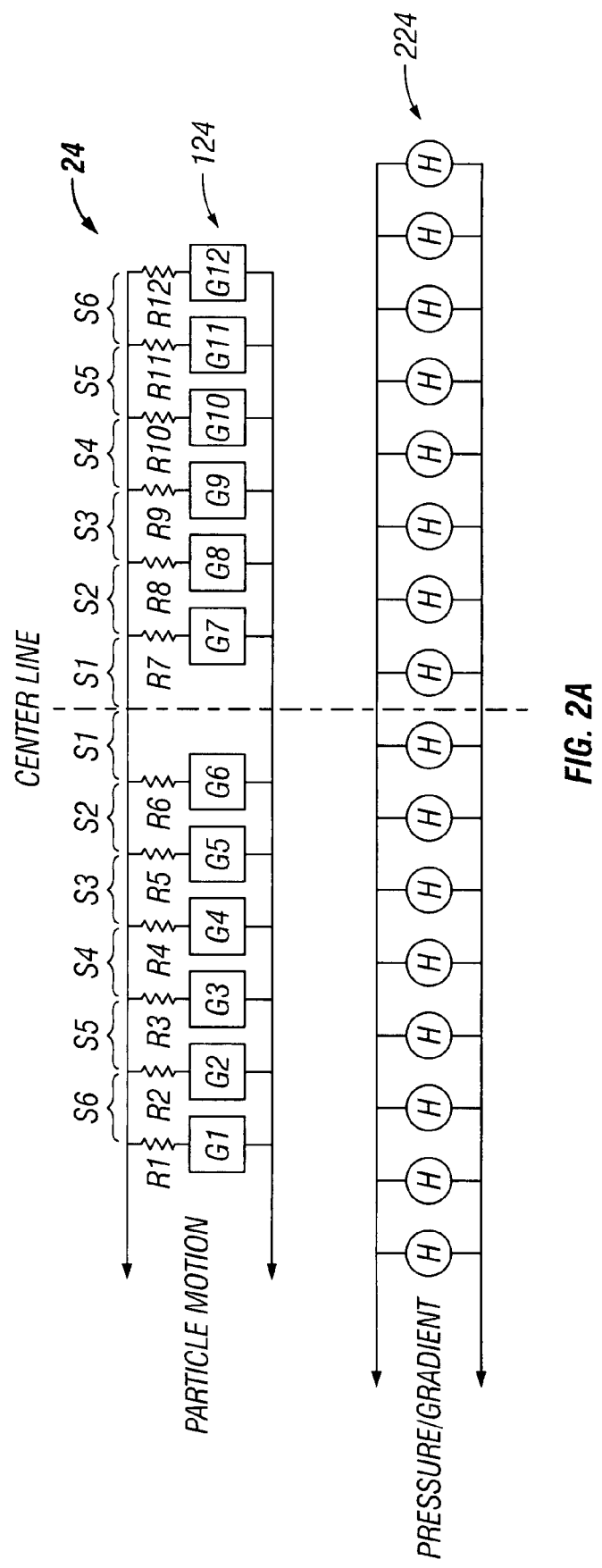

ARRAY GROUPING OF SEISMIC SENSORS IN A MARINE STREAMER FOR OPTIMUM NOISE ATTENUATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic surveying. More particularly, the invention relates to structures for marine seismic streamer systems and method for making such streamer systems that have improved noise suppression characteristics.

2. Background Art

In seismic surveying of the Earth's subsurface, data are obtained by applying seismic energy to the Earth near the surface and detecting seismic energy reflected from interfaces between different layers in subsurface formations. The seismic energy is reflected when there is a difference in acoustic impedance between the layer above the interface and the layer below the interface.

In marine seismic exploration, a seismic energy source, such as an air gun or array of air guns, for example, is used to generate seismic pulses in a body of water. The resulting seismic pulses are reflected back from subsurface interfaces and detected by sensors deployed in the water or on the water bottom. In a typical marine seismic operation, one or more cables called "streamers" are towed behind a vessel, typically at a water depth between about six to about nine meters. Sensors, typically hydrophones, are included in the streamers for detecting seismic signals. A hydrophone is a submersible pressure gradient sensor that converts the reflected seismic energy pressure waves into electrical or optical signals that are typically recorded for signal processing, and evaluated to estimate characteristics of the Earth's subsurface.

After the reflected seismic pulses reach the streamers, the reflected pulses continue to propagate to the water/air interface at the water surface, from which the pulses are reflected downwardly, and are again detected by the hydrophones in the streamers. The reflection coefficient at the surface is nearly unity in magnitude and negative in sign. The seismic pulses will thus be phase-shifted 180 degrees on reflection at the water surface. The downwardly traveling pulses are commonly referred to as the "ghost" signal, and the presence of this ghost signal creates a spectral notch in the seismic signal from the subsurface as detected by the hydrophones. Because of the spectral notch, some frequencies in the detected seismic signal are attenuated, whereas other frequencies are amplified.

Because of the ghost signal, the water surface acts like a filter, making it difficult to record seismic data outside a selected bandwidth without excessive attenuation or notches in the frequency spectrum of the recorded seismic data. Maximum attenuation will occur at frequencies for which the distance between the detecting hydrophone and the water surface is equal to one-half the wavelength of the seismic energy. Maximum amplification will occur at frequencies for which the distance between the detecting hydrophone and the water surface is one-quarter wavelength of the seismic energy. The wavelength of the seismic energy is equal to the velocity divided by the frequency, and the velocity of an acoustic wave in water is about 1500 meters per second. Accordingly the location in the frequency spectrum of the resulting spectral notch is readily determinable. For example, for a streamer water depth of 7 meters, maximum attenuation will occur at a frequency of about 107 Hz. and maximum amplification will occur at a frequency of about 54 Hz.

In "ocean bottom" seismic operations, in which sensors are deployed on the water bottom, it is well known to utilize particle motion sensors (typically geophones) in conjunction with pressure gradient sensors. A geophone detects energy in the form of particle velocity and generates a corresponding signal, whereas a hydrophone detects a pressure gradient and generates a corresponding signal. As stated above, the reflection coefficient at the surface is nearly unity in magnitude and negative in sign. The seismic pulses will thus be phase-shifted 180 degrees on reflection at the water surface. Further, the geophone has directional sensitivity, whereas the hydrophone does not. Accordingly, the upgoing wavefield signals detected by the geophone and the hydrophone will be in phase. The downgoing signal detected by the hydrophone and geophone is phase shifted by 180 degrees, but because the geophone is directionally sensitive, whereas the hydrophone is not, the downgoing wavefield signals detected by the geophone and the hydrophone will be 180 degrees out of phase. Various techniques have been proposed for using this phase difference to reduce the spectral notch caused by the ghost reflection. See for example, U.S. Pat. No. 4,486,865 to Ruehle; U.S. Pat. No. 5,621,700 to Moldoveanu; U.S. Pat. No. 4,935,903 to Sanders et al.; and U.S. Pat. No. 4,979,150 to Barr.

There have been various proposals for including particle motion sensors in streamer cables. See, for example, U.S. Pat. No. 7,239,577 which issued to Tenghamn et al. on Jul. 3, 2007. The main purpose of the particle motion sensors (typically geophones) is to provide data in the frequency spectrum around the ghost "notch" frequency, and to enable the determination of the upgoing and downgoing seismic wavefields. Such determination enables the streamer to be towed at greater depths without spectral notches in the seismic data in the frequency range of interest. At greater depths, the environment is less noise and the quality of the seismic data is improved, thereby increasing the "weather window" in which quality seismic data may be recorded.

In ocean bottom seismic operations, the particle motion sensor, typically a geophone, is placed in direct contact with the ocean bottom, and to improve the contact between the geophone and the ocean floor, the geophone assembly is typically made to be quite heavy. However, in order to include geophones in a steamer cable, the geophones need to be small, and the streamer cable motion will subject the geophone to greater noise than a geophone will experience when resting on the ocean floor.

Seismic steamer cables that include velocity sensors, and methods for reducing noise in the resulting signal resulting from geophone noise have been proposed. See, for example U.S. Pat. No. 7,239,577 which issued to Tenghamn et al. on Jul. 3, 2007 and US Published Application No. 2005/0195686, published on Sep. 8, 2005. However, there is a continuing need for systems and methods for noise suppression in the seismic signal detected by sensors in marine seismic streamers.

SUMMARY OF THE INVENTION

A marine seismic streamer according to one aspect of the invention includes at least one particle motion sensor array.

The array includes a plurality of particle motion sensors disposed at spaced apart locations along the streamer. Outputs of the particle motion sensors are functionally coupled to form an array. A number of the particle motion sensors and a spacing between adjacent particle motion sensors are selected to attenuate noise in a selected mode of propagation and within a selected wavenumber range. The streamer includes means for weighting a signal output of each particle motion sensor in the at least one array. A signal weight applied to each sensor by the means for weighting is selected to optimize attenuation of the noise.

A marine seismic streamer according to another aspect of the invention includes a plurality of particle motion sensor arrays disposed along the streamer at longitudinally spaced apart positions. Each particle motion sensor array includes a plurality of particle motion sensors disposed at spaced apart locations along the streamer. Outputs of the particle motion sensors are functionally coupled to form an array. A number of the particle motion sensors and a spacing between adjacent particle motion sensors are selected to attenuate noise in a selected mode of propagation and within a selected wavenumber range. The streamer includes means for weighting a signal output of each particle motion sensor in the at least one array. A signal weight applied to each sensor by the means for weighting is selected to optimize attenuation of the noise.

Other aspects and advantages of the invention will be apparent from the following description and the appended claims.

BRIEF DESCRIPTION OF THE DRAWINGS

FIG. 2A shows one example of a sensor array according to the invention.

DETAILED DESCRIPTION

Figure 1:
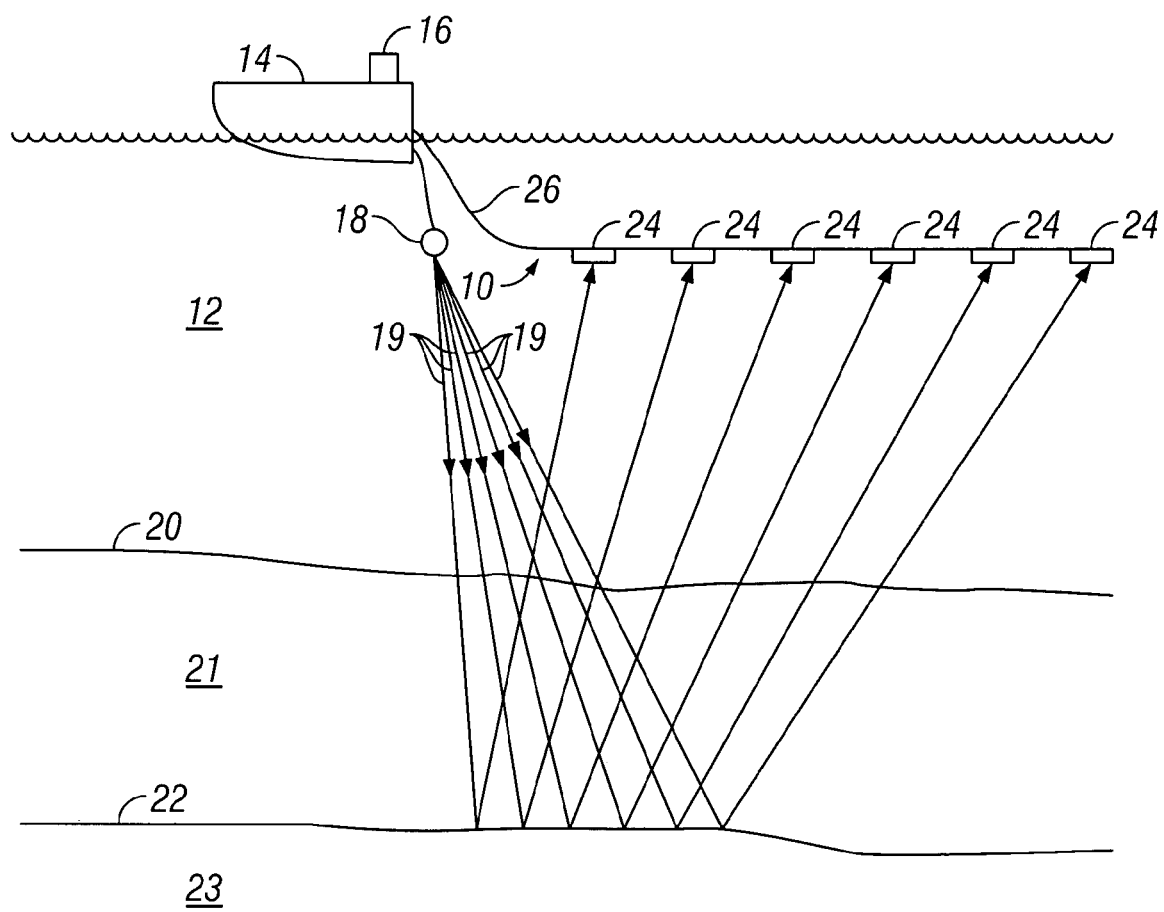
FIG. 1 shows an example seismic acquisition system including a streamer.

FIG. 1 shows an example marine seismic data acquisition system as typically used in acquiring seismic data. A seismic vessel 14 moves along the surface of a body of water 12 such as a lake or the ocean. The marine seismic survey is intended to detect and record seismic signals related to structure and composition of various subsurface formations 21, 23 below the water bottom 20. The seismic vessel 14 includes source actuation, data recording and navigation equipment, shown generally at 16 and referred to for convenience herein as a "recording system." The seismic vessel 14, or a different vessel (not shown), can tow one or more seismic energy sources 18, or arrays of such sources, in the water 12. The seismic vessel 14, or a different vessel, tows at least one seismic streamer 10 at a selected depth below the surface of the water 12. The streamer 10 can be coupled to the vessel 14 by a lead in cable 26. A plurality of sensor arrays 24 are disposed at longitudinally spaced apart locations along the streamer 10. Each sensor array 24 may be formed by mounting a seismic sensor in a sensor holder, and distributing a plurality of the seismic sensors in their respective sensor holders at particular positions along the length of the streamer 10. The example acquisition system shown in FIG. 1 includes only one streamer for purposes of clarity of the illustration. The present invention is intended to include within its scope systems in which any number of streamers are towed, for example, in parallel behind the seismic vessel 14 or by another vessel for purposes of conducting "three-dimensional" seismic surveys. Accordingly, the number of streamers used in any example, the placement of such streamers and the particular vessel that tows any one or more streamers are not intended to limit the scope of the invention.

During operation of the seismic acquisition system, certain equipment (not shown separately) forming part of or associated with the recording system 16 causes the seismic energy source 18 to actuate at selected times. When actuated, the source 18 produces seismic energy 19 that emanates generally outwardly from the source 18. The energy 19 travels downwardly, through the water 12, and passes, at least in part, through the water bottom 20 into the formations 21, 23 below the water bottom 20. Seismic energy 19 is at least partially reflected from one or more acoustic impedance boundaries 22 below the water bottom 20, and travels upwardly whereupon it may be detected by the sensors in each sensor array 24. Structure of the formations 21, 23, among other properties of the Earth's subsurface, can be inferred by travel time of the energy 19 and by characteristics of the detected energy such as its amplitude and phase.

A particular implementation of a sensor array according to the invention is shown in FIG. 2A. FIG. 2A shows a sensor array 24, which includes a particle motion sensor array 124 and a pressure or pressure gradient sensor array 224. The particle motion sensor array 124 includes a plurality of seismic particle motion sensors G (illustrated in FIG. 2A as G1-G12) arranged along the length of the streamer (10 in FIG. 1) and longitudinally spaced apart from each other. The particle motion sensors G may be geophones configured to measure a vertical component of particle motion in the water (12 in FIG. 1) or may be multiple component particle motion sensors. The particle motion sensors G may also be accelerometers or other type of sensor responsive to particle motion in the water, and therefore the term "particle motion sensor" is intended to mean any of the foregoing types of sensors. The particle motion sensors G can generate an electrical signal related to the particle motion (for example, velocity) at the position of each particle motion sensor G. In the array 124 shown in FIG. 2A, the electrical output of the particle motion sensors G can be coupled in electrical parallel as shown and can provide a combined particle motion signal at the array terminals as shown. The array 224 of pressure sensors or pressure gradient sensors, the sensors being shown individually at H and which may be as hydrophones, for example, may be located so that the centerline (CENTER LINE in FIG. 2A) of the pressure or gradient sensor array 224 is substantially at the same longitudinal position as the centerline of the array 124 of particle motion sensors G. The pressure or pressure gradient sensors H can produce an electrical signal related to the pressure or time derivative of the pressure. Electrical output of the pressure or pressure gradient sensors H can be coupled in electrical parallel as shown in FIG. 2A to provide a pressure or pressure gradient signal at the terminals shown.

The pressure or pressure gradient sensors H are also spaced longitudinally from each other. In the particular implementation shown in FIG. 2A, sixteen individual hydrophones H combined in each sensor array 24. Typically, the center line of each sensor array (CENTER LINE in FIG. 2A) will be spaced apart from the center line of the preceding or subsequent sensor array along the streamer by about 12.5 meters. The center line defines the longitudinal mid point along the length of the array 24. A typical streamer segment is about 75 meters long and includes six such arrays, for a total of ninety-six individual pressure or pressure gradient sensors H and associated particle motion sensors G.

As explained in the Background section herein, among the purposes of including the particle motion sensors G in each array 24 are to provide spectral information in the "ghost" notch frequency in the pressure or pressure gradient signals, and to be able to determine an upgoing component and a downgoing component of the measured seismic wavefield (see 19 in FIG. 1). Providing spectral information in the ghost notch frequency can enable, among other possible advantages, the streamer to be towed at greater water depths without spectral notches in the seismic data, thereby increasing the severity of weather conditions in which the streamer may be used as well as improving the quality of the seismic data. The particle motion sensors G, however, are susceptible to noise, which is typically dominated by transverse vibrations moving along the streamer (10 in FIG. 1) at velocities from about 20 to 60 meters per second, depending on the axial tension present in the streamer during towing. Such noise can be relatively high amplitude in comparison to the seismic signals.

The particle motion sensor array 124 may include a selected number, in the present example twelve, of particle motion sensors G1 through G12 arranged at longitudinal spacings therebetween indicated by S1 through S6 from the center line. U.S. Pat. No. 7,239,577 issued to Tenghamn et al. describes a particle motion sensor suitable for use in such a system. The center line defines the mid point along the length of the array 24 substantially as explained above. The particle motion sensors G1 through G12 each can generate an electrical signal related to an aspect of particle motion, such as velocity or acceleration, as explained previously herein.

The particle motion sensors G1 through G12 may be connected in parallel to form a "network", with each particle motion sensor G1 through G12 being coupled to the parallel network through a respective resistor R1 through R12. The resistors R1 through R12 each serve the purpose of providing a respective weight to the contribution of the output of each particle motion sensor G1 through G12 to the combined output (e.g. "PARTICLE MOTION" as shown in FIG. 2A) at the terminals of the particle motion sensor array 224. The number of particle motion sensors shown in the array 124 in FIG. 2A is only one example of a number of particle motion sensors that may be used in an array formed according to various aspects of the invention. A method by which a number of particle motion sensors may be selected in other examples will be further explained below.

In the present example, as well as in other examples, the longitudinal spacings S1 through S6 between adjacent particle motion sensors G and the resistors R1 through R12 may be selected to optimize the response of the particle motion sensor array 224, particularly with respect to attenuation of certain types of noise, such as the transverse waves moving in a selected velocity range, for example about 20 to 60 meters per second as explained above. The combined signal output $S(x, w)$ from a weighted particle motion sensor array having a selected number N of individual particle motion sensors can be expressed as:

$$S(x, w) = \frac{1}{W} \sum_{n=1}^{N} w_n S(x_n)$$

where $S(x_n)$ represents the signal output of the individual particle motion sensors located at a longitudinal position represented by $x_n$, and $w_n$ represents a corresponding weight (equivalent to one of the resistors R1 through R12) for that particular particle motion sensor. W represents the sum of all weights $w_n$ for the array 124 of particle motion sensors (see 24 in FIG. 2A).

Optimization in the present context means to determine the best combination of position (spacing) and weight values for each sensor, expressed as vectors x and w, respectively, for attenuation of a particular type of noise, such as the transverse vibration noise explained above within a selected wavenumber range.

An example of optimizing the positions and weights may be explained as follows. A cost function $E(x, w)$ may be defined to be the integral of the wavenumber (k) response of the particle motion sensors (G in FIG. 2A), weighted over different wavenumber intervals.

$$E(x, w) = \sum_i r_i \int_{k \in k_i} \hat{S}(x, w) \, dk$$

wherein the quantity $\hat{S}$ may be determined from the expression:

$$\hat{S}(x, w) = \left[ \frac{1}{W} \sum_{n=1}^{N} w_n \cos(k x_n) \right]^2 + \left[ \frac{1}{W} \sum_{n=1}^{N} w_n \sin(k x_n) \right]^2$$

and where the wavenumber k is defined as the velocity divided by the frequency (k=v/f) of the seismic energy. The physical meaning of the wavenumber k is the number of wave cycles per unit distance. The wavenumber is therefore the spatial equivalent of the frequency f and it is the reciprocal of the wavelength. The coefficients $r_i$ may be chosen so that the output of the cost function E is high for the wavenumbers of the types of noise that it is desirable to suppress. The optimization can be performed by determining the minimum of the cost function with respect to the position and weight attributed to each particle motion sensor, or expressed mathematically, the [x, w] space.

Figures 2B, 2C:
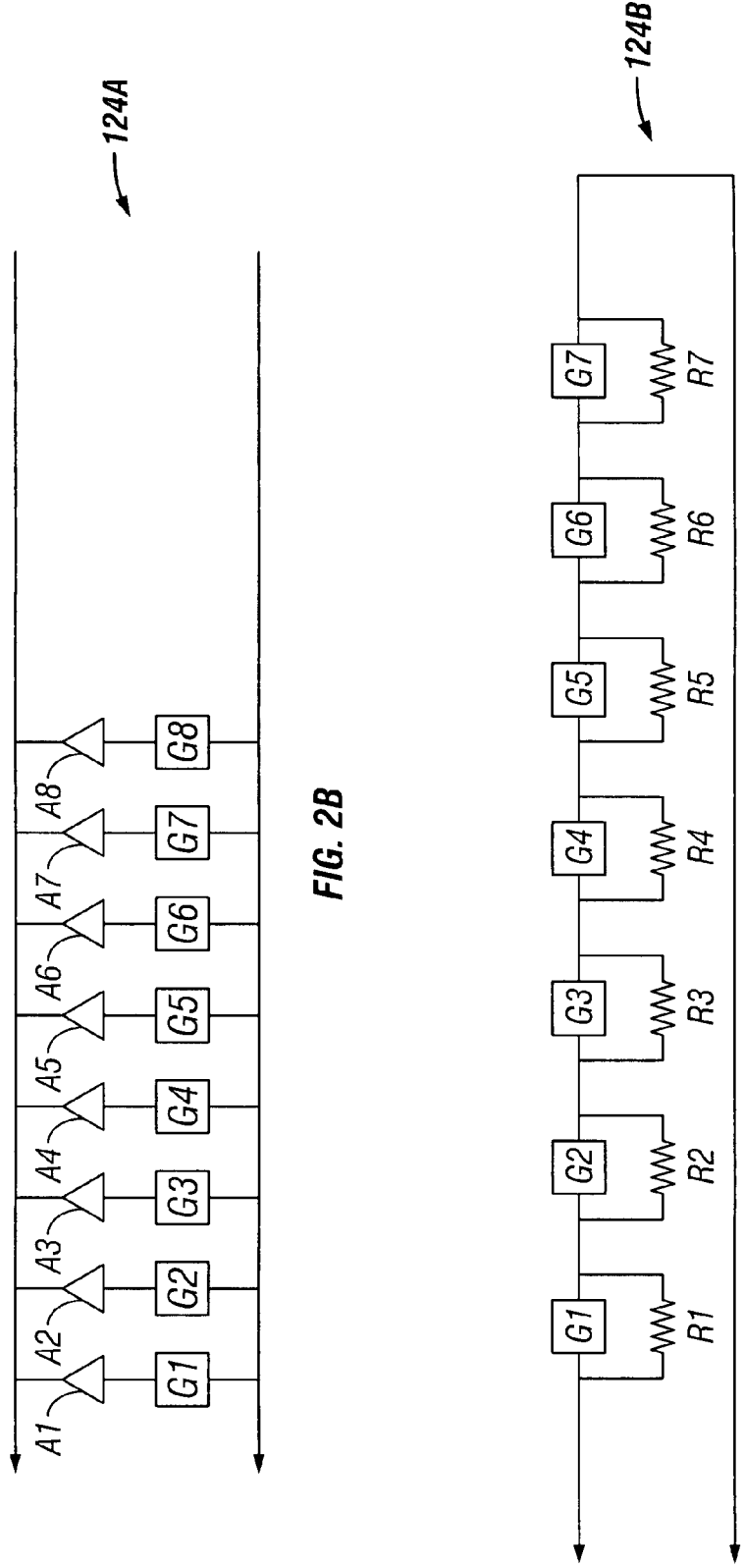
FIG. 2B shows a different example of a particle motion sensor array.
FIG. 2C shows a different example of a particle motion sensor array.

It will be appreciated by those skilled in the art that the example array shown in FIG. 2A is not the only type of electrical connection that can be used in a particle motion sensor array formed according to the invention. Another example is shown in FIG. 2B in which the particle motion sensor array includes eight particle motion sensors G1-G8 each coupled at one output terminal to an input terminal of a respective amplifier A1-A8. A gain of each amplifier A1-A8 may be selected to provide the equivalent weight to the respective particle motion sensor signal to result in the optimized performance determined as explained above.

Yet another example of a particle motion sensor array is shown at 124B in FIG. 2C. In this example, the particle motion sensors G1-G7 are coupled electrically in parallel, and each particle motion sensor G1-G7 is associated with a shunt resistor R1-R7 coupled across the output terminals. The value of each shunt resistor R1-R7 may be selected to provide the appropriate weight to the output of each particle motion sensor G1-G7 as explained above.

Figure 2D:
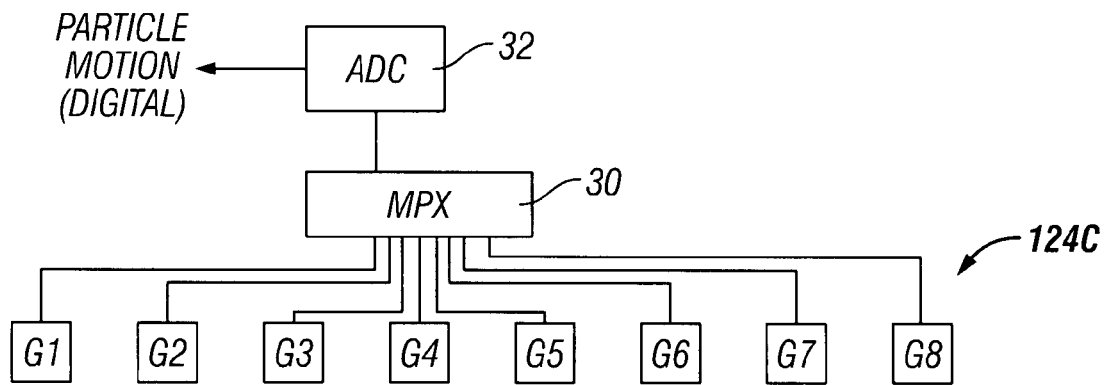
FIG. 2D shows a digital array that may use numerical group forming techniques.

It is also within the scope of this invention to digitally weight the output of each particle motion sensor, and to combine the digitally weighted outputs numerically or otherwise in a computer or similar device. Referring to FIG. 2D, each of a plurality of particle motion sensors G1 through G8 can be coupled to a respective input terminal of a multiplexer 30. Output of the multiplexer 30 can be digitized in an analog to digital converter (ADC) 32. The output of the ADC 32 represents the signal amplitude at each particle motion sensor G1-G8. The digitized signal can be communicated to the recording system (16 in FIG. 1) where numerical weighting and summing can be performed.

As may be inferred from the foregoing explanation of the examples shown in FIGS. 2A through 2D, the term "weight" as used herein is intended to mean any form of scaling of the output of individual sensor outputs in a signal sum based on the signals from all the sensors in the array.

Figure 3:
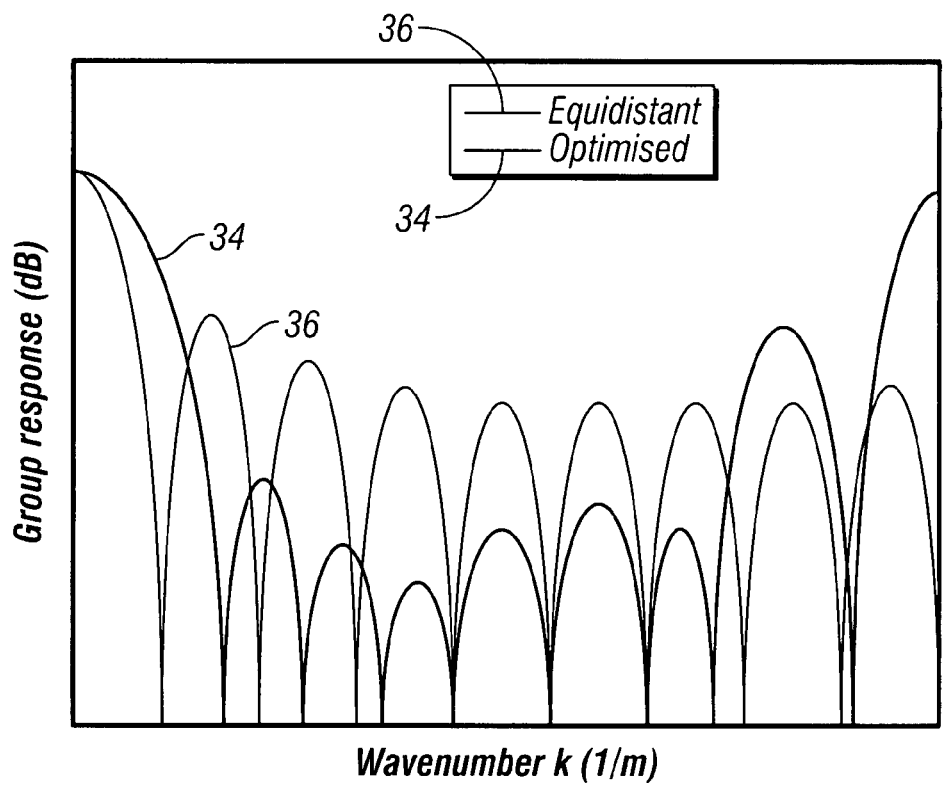
FIG. 3 shows response of an array or group of particle motion sensors made according to the invention in the wavenumber domain.

One example of response of a particle motion sensor array configured according to the invention as contrasted with an equal spacing array is shown in the graph of FIG. 3, which represents attenuation with respect to wavenumber. Response of the sensor array, at curve 36, shows better signal attenuation with in a selected wavenumber range than the prior art sensor array, shown at curve 34. The selected wavenumber range will correspond to a particular frequency range depending on the wave velocity.

Marine seismic streamers made according to the invention may have improved rejection of certain types of noise than streamers made using equally spaced arrays of particle motion sensors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine seismic streamer, comprising:
a plurality of particle motion sensor arrays disposed along the streamer at longitudinally spaced apart positions, each particle motion sensor array including a plurality of particle motion sensors disposed at spaced apart locations along the streamer, outputs of the particle motion sensors coupled to form an array, a spacing between each adjacent particle motion sensor and a signal weight of each particle motion sensor in a particle motion sensor array being individually selected to attenuate noise in a selected mode of propagation and within a selected wavenumber range wherein at least one particle motion sensor has a weight or spacing different from another particle motion sensor in the array.

2. The streamer of claim 1 wherein the particle motion sensors comprise geophones.

3. The streamer of claim 1 wherein the signal weight comprises a resistor coupled in series with an output of the respective particle motion sensor.

4. The streamer of claim 1 further comprising an array of pressure responsive sensors associated with each array of particle motion sensors.

5. The streamer of claim 4 wherein the pressure responsive sensors comprise hydrophones.

6. The streamer of claim 4 wherein a longitudinal center of each particle motion sensor array and a longitudinal center of each array of pressure responsive sensors are located at substantially a same longitudinal position along the streamer.

7. The streamer of claim 4 wherein a spacing and a signal weight for each sensor is selected to minimize a value of a cost function, the cost function related to a wavenumber response of the particle motion sensors.

8. The streamer of claim 1 wherein the signal weight is selected by selecting a value of a resistor coupled in series with a signal output of the particle motion sensor.

* * * * *